Feb. 27, 1962 R. SEIBEL ETAL 3,022,878
COMMUNICATION DEVICE
Filed Jan. 11, 1960 7 Sheets-Sheet 1

INVENTORS
ROBERT SEIBEL
NATHANIEL ROCHESTER
BY Geoffrey Knight
ATTORNEY

FIG. 6

BSP = BACK SPACE
RTN = CARRIAGE RETURN
SLK = SHIFT LOCK
SP2 = 2 SPACES
SP3 = 3 SPACES
' = UPPER CASE

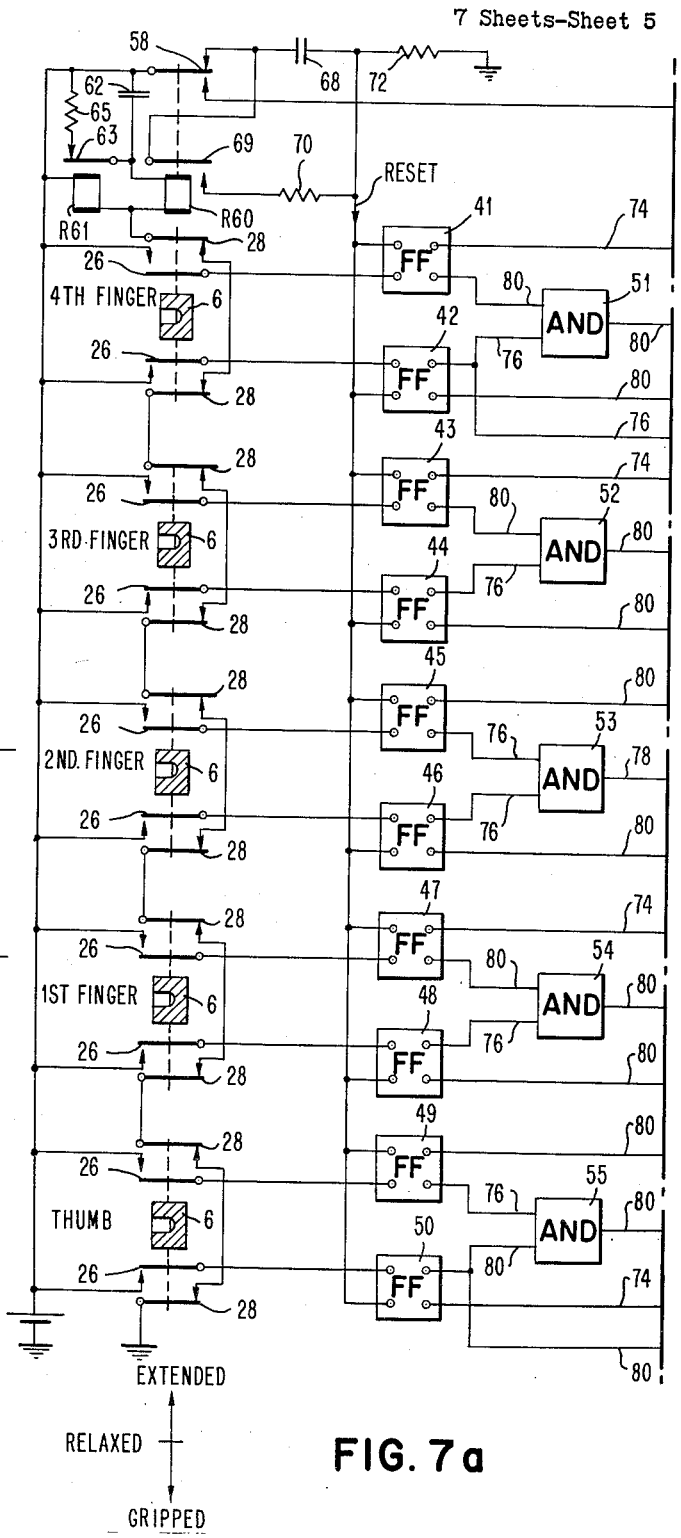
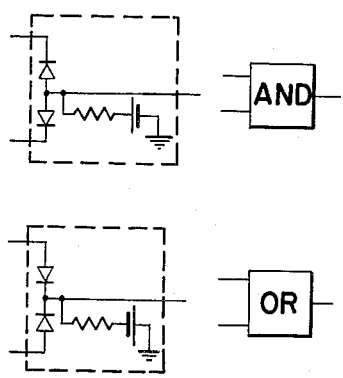
FIG. 7d
FIG. 7a

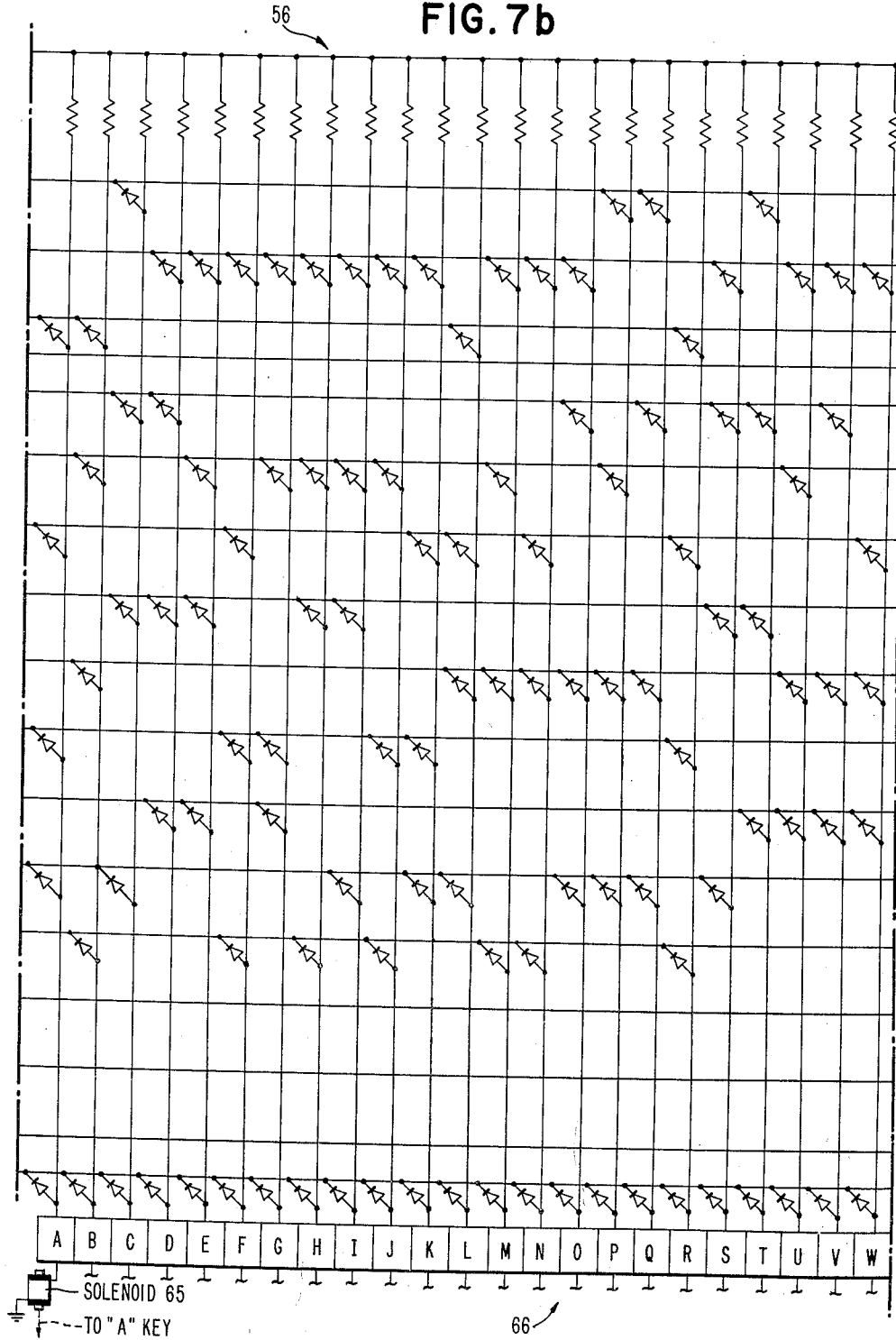

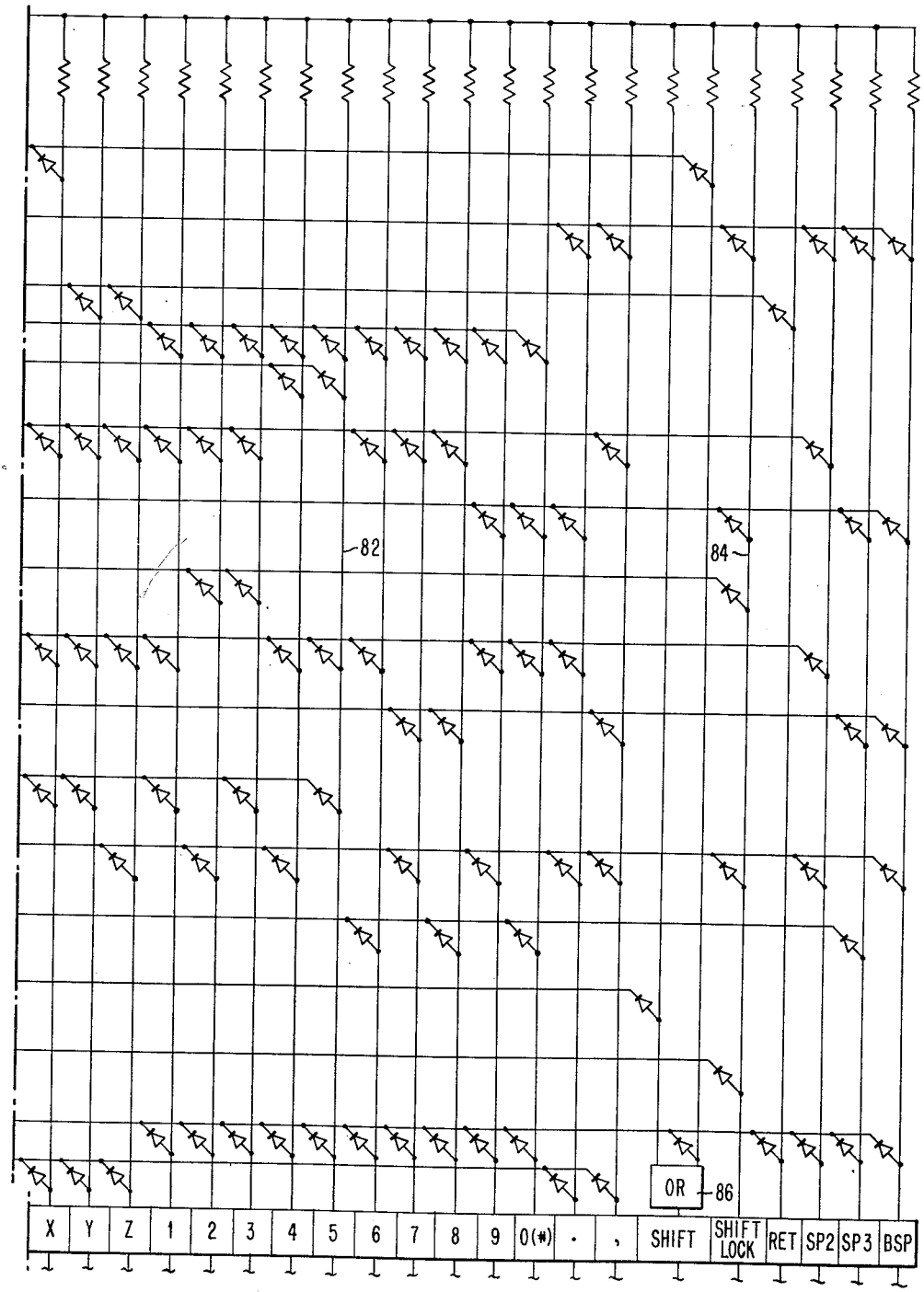

United States Patent Office 3,022,878
Patented Feb. 27, 1962

3,022,878
COMMUNICATION DEVICE
Robert Seibel, Putnam Valley, and Nathaniel Rochester, Mount Kisco, N.Y., assignors to International Business Machines Corporation, New York, N.Y., a corporation of New York
Filed Jan. 11, 1960, Ser. No. 1,768
14 Claims. (Cl. 197—19)

This invention relates to man-machine communications, and in particular, to a novel keyboard with a shape dependent upon the form of the relaxed human hand, and keys arranged so as to reduce extraneous hand and arm movements to a minimum.

The prior art shows keyboards of several types, none providing deep finger recesses or supporting the operator's hand in a relaxed position, and none permitting as great a complexity of communications to be transmitted with as little physical movement as is permitted in this invention. Keyboards mounted around the hand and remote from the machine to be controlled are likewise not shown in the prior art. It is usually desirable, regardless of the use of the keyboard, that the operator's effort be reduced as much as possible. If the keyboard is located in a high-acceleration airplane or missile, it is highly desirable to reduce the amount of limb movement to a minimum so that the mass which the operator must move and control is as small as possible.

One object of this invention is to provide a man-machine communication device that surrounds the hand and is remote from the controlled machine allowing relatively free movement of the hand, while controlling the machine by moving the fingers with respect to the hand, rather than with respect to the machine.

Another object of this invention is to provide improved man-machine communication comprising a keyboard containing a hand and/or arm rest and fingertip recesses so that the operator's hand and arm are supported in a relaxed position.

Another object of this invention is to provide a keyboard of the kind stated having keys or transducers associated with individual fingers of one or both hands. These transducers are movable by the fingers with a minimum of extraneous motion of hand(s), arm(s), and momentarily unused finger(s).

A further object of this invention is to provide a keyboard of the kind described which utilizes the gripping and extending motion of the fingers, and also the usual depressing motion of the fingers if desired.

A further object of this invention is to provide a keyboard of the kind described which utilizes movements of one finger or combinations of fingers, permitting a greater complexity of communication to be transmitted with reduced physical movement.

A further object of this invention is to provide a keyboard into which the hand is inserted, much as the hand is inserted into a glove. Such a keyboard is adaptable to being fitted into a glove.

The above and further objects of the invention are accomplished by means of a special keyboard with a shape dependent upon the shape of the operator's relaxed (semiclosed) hand. A rest is provided for the metacarpus (that part of the hand that is between the wrist and phalanges). The phalanx farthest from the metacarpus (distal phalanx) of each finger, including the thumb, controls the operation of a transducer unit. The transducer units contain control elements in which the respective distal phalanges can be securely socketed. The metacarpus rest is spaced close enough to the control elements to prevent the fingers from being removed from the elements without a serious effort. Thus, the combination of the metacarpus rest and control elements acts as a glove around the hand. When the operator's hand is placed between the metacarpus rest and control elements, movement of the fingers with respect to the hand (rather than with respect to the machine to be controlled) controls the machine. The control elements have two or more positions—a center "relaxed" position, and an inward "gripped" position, and/or an outward "extended" position. Each transducer is mounted so that the direction of movement of the control element is along the line of easiest finger movement (that is, in the direction that a fingertip moves if a finger is gripped and then extended). A fourth "depressed" position, which is a feature of the preferred embodiment of this invention, is obtained by depressing the finger.

A one-hand keyboard with a three-position transducer unit provides 243 ($3^5$) possible combinations. If one neglects the position where all fingers are relaxed, there are 242 possible combinations remaining. If each hand is provided with a keyboard there are 59,049 ($3^{10}$) possible combinations. If one again neglects the position where all fingers are relaxed, there are 59,048 possible combinations remaining.

If a one-hand keyboard is connected to serve as the input to a typewriting machine, an operator may strike any of the approximately 90 symbols or functions of the standard typewriter keyboard and still have more than 100 possible symbols left over for other uses. These leftover symbols may be utilized in a form of keyboard shorthand, such that each of these stands for more than one letter or standard symbol. The leftover symbols could stand for such letter sequences as "ed," "ing," "tion," "and," "the," etc., these sequences being chosen on the basis of their frequency of occurrence in the English language. Those used most frequently could be assigned to finger positions easiest to effect. In addition, some of the leftover symbols could be reserved for frequently used word combinations, in the manner disclosed in a patent to R. R. Seeber, Jr., 2,717,686, issued September 13, 1955.

In the preferred embodiment of this invention, four-position transducer units are mounted around each fingertip providing 1,023 ($4^5-1$) possible combinations for the one-hand keyboard. Ten finger operation raises the number of possible combinations to 1,048,575 ($4^{10}-1$).

The foregoing and other objects, features and advantages of the invention will be apparent from the following more particular description of preferred embodiments of the invention, as illustrated in the accompanying drawings.

In the drawings:

FIG. 4a is an orthographic projection of a three-position transducer unit used in the invention.

FIGURE 4b is an orthographic projection of a two-piece thimble element suitable for use in the transducer unit in FIG. 4a.

FIG. 6 is a chart illustrating a sample keyboard output nomenclature to be used in conjunction with a one-hand, three-position keyboard and an electric typewriter.

FIG. 7 is a diagram showing the layout of FIGS. 7a, 7b and 7c.

FIGS. 7a, 7b and 7c together constitute a schematic diagram of a one-hand, three-position keyboard in conjunction with an electric typewriter.

FIGURE 7d is a schematic diagram of two circuits shown as blocks in FIGS. 7a and 7c.

Figure 2:
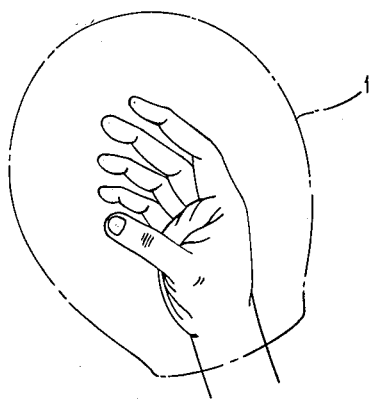
FIG. 2 is an orthographic projection of a one-hand keyboard and a remote machine controlled by the keyboard.
Figure 1:
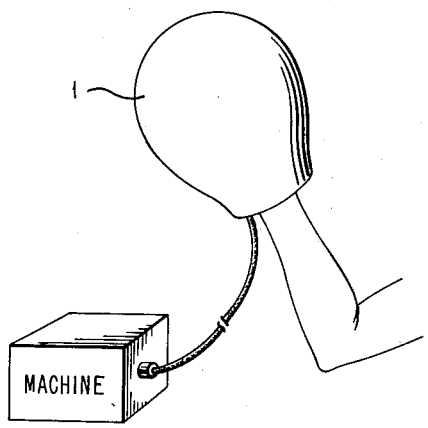
FIG. 1 is an orthographic projection of an operator's hand when in the relaxed position assumed for operating a keyboard in accordance with the invention.
Figure 3:
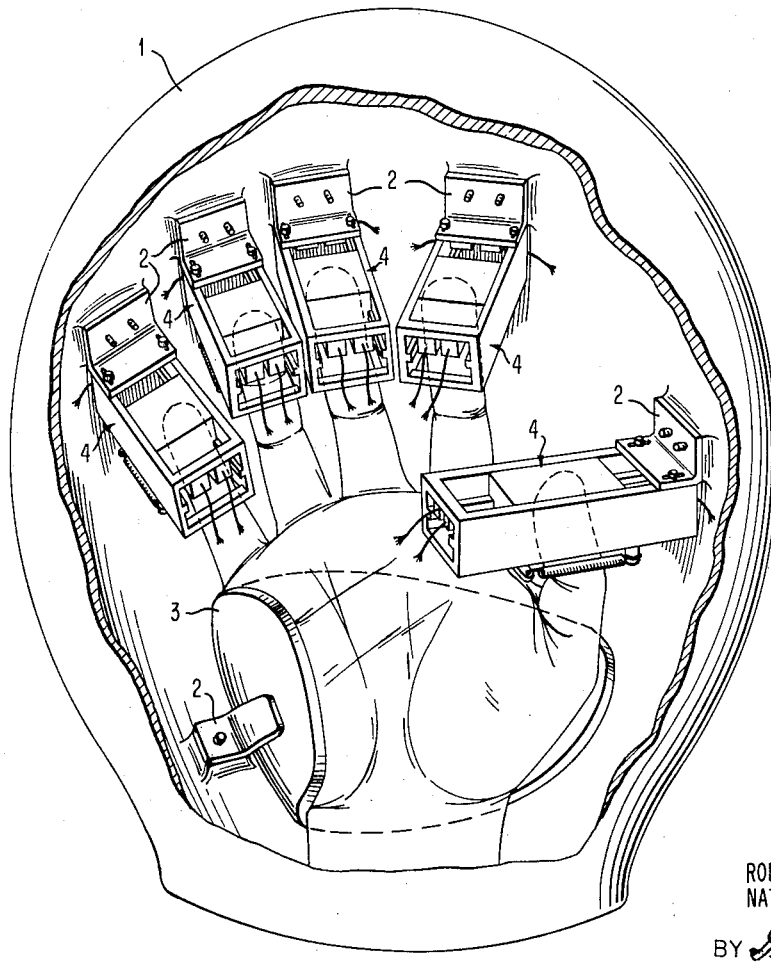
FIG. 3 is an orthographic projection of a one-hand keyboard, with the casing in cross section, embodying the invention.

The human hand is shown in its approximate comfortably relaxed (semiclosed) position in FIG. 1. The keyboard in this invention is designed for this relaxed-hand position. FIG. 2 shows a one-hand keyboard casing 1 connected by a cable to the machine to be controlled. FIG. 3 shows a one-hand keyboard comprised of a casing 1, and attached to the casing by brackets 2, a metacarpus rest 3, and five transducer units 4 mounted for operation by the distal phalanges (fingertips). The metacarpus rest 3 has the function of holding the hand so that the fingers are maintained in position in the transducer units 4 when no serious effort to remove the hand is present. If transducers 2 were mounted in or around the glove of a pressurized suit, the glove itself could provide the rest.

An example of a simple transducer unit 4 is illustrated in FIG. 4a. A thimble element (control element) 6 contains a circular or oval recession 8 into which one of the operator's fingertips is placed. Thimble element 6 is slidably mounted within transducer frame 9 and resiliently maintained at its center position by two springs 10 attached to brackets 12 and pins 14. The thimble element 6 could have a variety of shapes, including ring-shaped, and could have a square or otherwise non-circular or non-oval recession. Similarly, the thimble element could be split into two pieces, with one piece slidable in each direction, as shown in FIG. 4b. In this case the fingertip would be placed between the opposing curved or flat surfaces of the pieces. Two rails 16 and the associated grooves 18 (in the thimble element 6) hold the thimble element within the sides 9a of the frame 9. Movement of the operator's fingertip away from the relaxed position causes thimble element 6 to be displaced from the center of the frame 9 causing transducers to be operated. In the embodiment shown, the transducers are normally open switches 26 and normally closed switches 28 (mounted on end pieces 9b) which are operated when thimble element 6 is displaced to either limit position. The switches 26 and 28 may be connected to the eight output leads 24 as shown. The number and type of switches 26 and 28 used is dependent upon the requirements of the circuit connected to the output leads 24.

Figure 5:
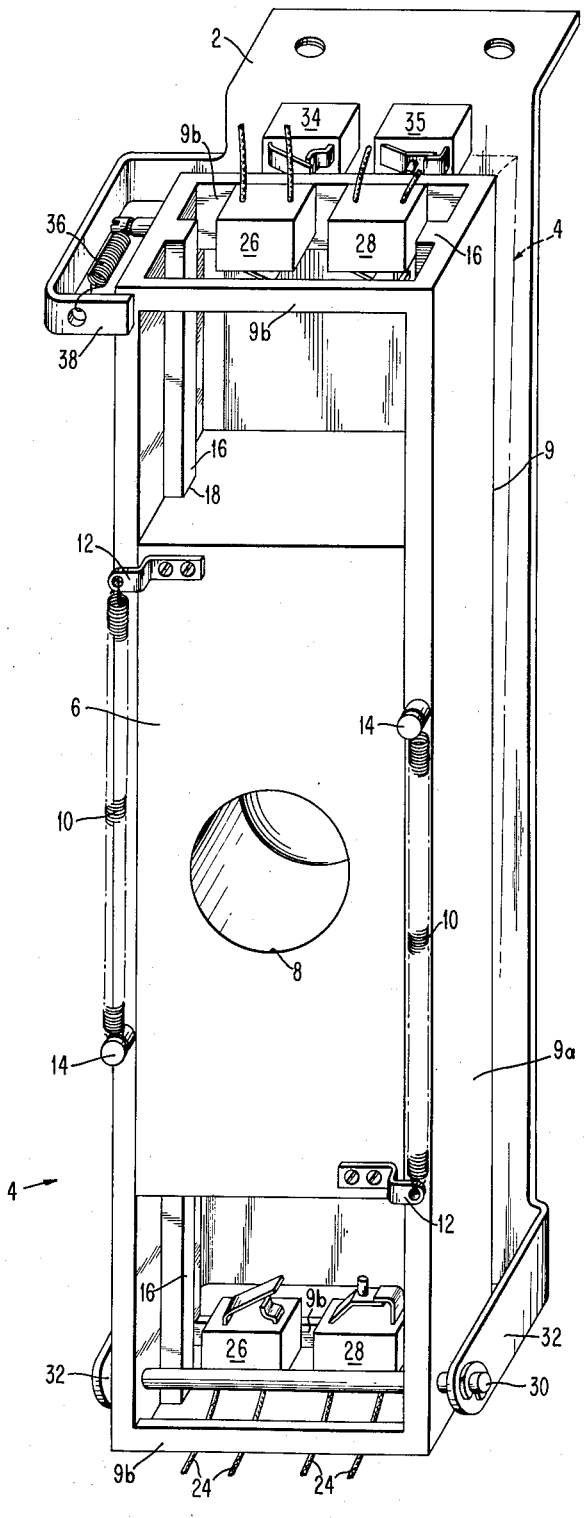
FIG. 5 is an orthographic projection of a four-position transducer unit used in the invention.

The preferred embodiment of transducer unit 4 is shown in FIG. 5 where, in addition to the extended, relaxed, and gripped positions, a depressed finger position is included. When the finger is depressed, the transducer frame 9 rotates about pivot 30, which is attached to extensions 32 of bracket 2, operating normally-open switch 34 and normally-closed switch 35. A spring 36 returns the transducer frame 9 to its rest position when pressure is removed. A stop 38 limits the motion of the frame 9.

Figure 4:
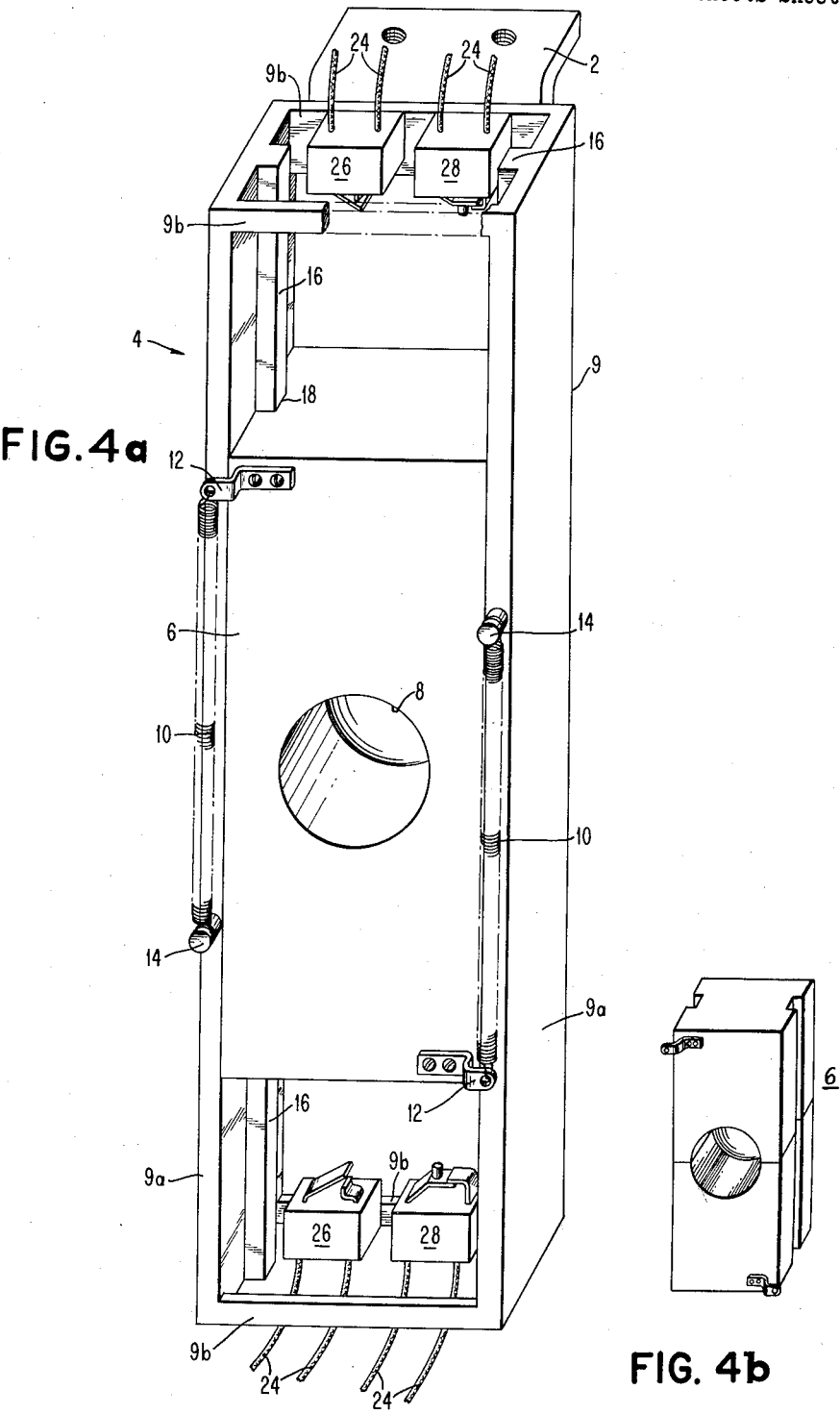
Figure 6:
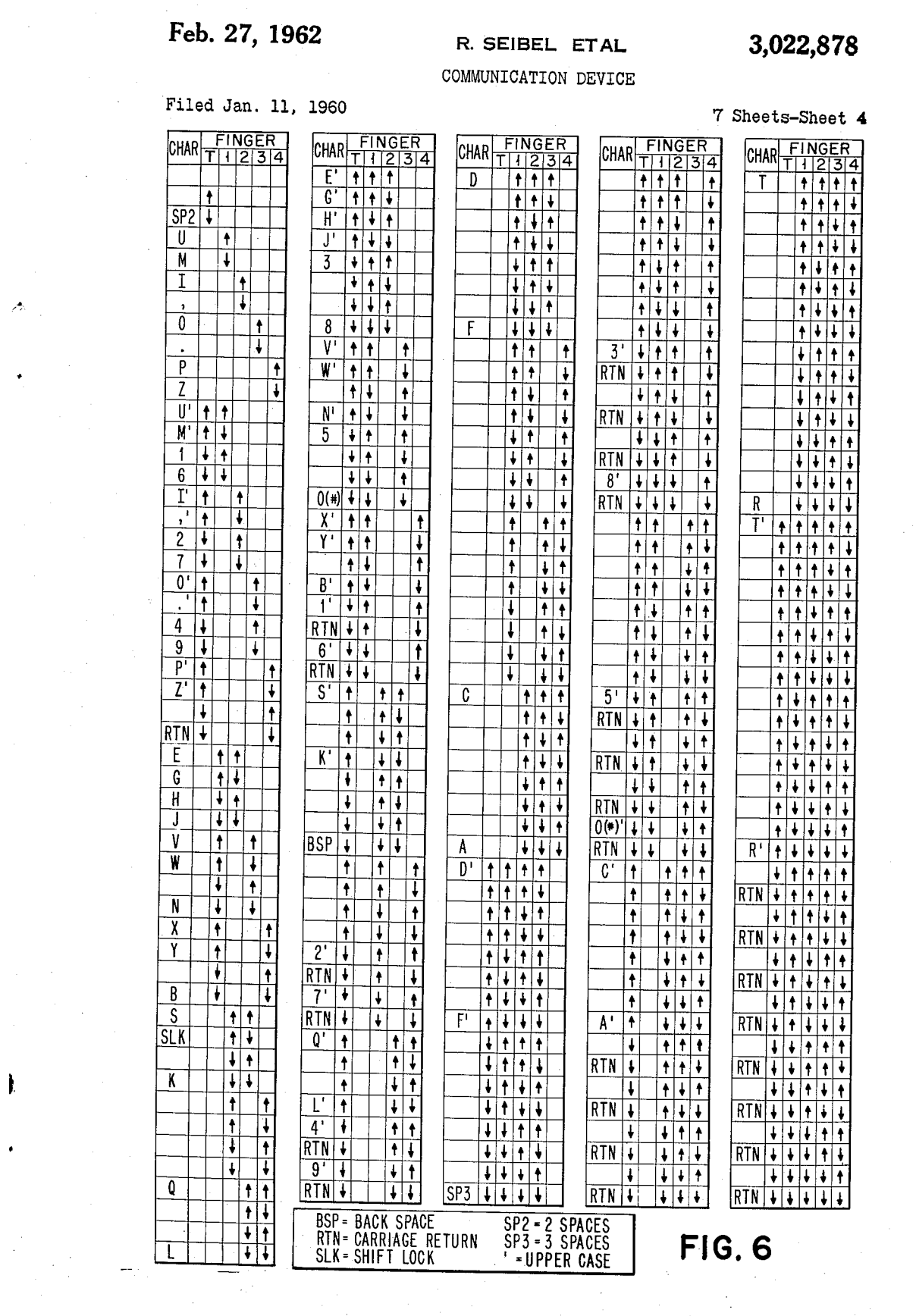

Whereas the keyboard is suitable for control of all cases where man-machine communication is employed, including a space vehicle, a computer, etc., the embodiment following shows the keyboard controlling an electric typewriter. FIG. 6 indicates the possible combinations of finger movements with a one-hand keyboard comprising five three-position transducers as shown in FIG. 4. A chart indicating the four-finger combinations of the preferred embodiment is not shown due to the large number of combinations available. In the chart, the letter "T" indicates the thumb, and "1," "2," "3" and "4" indicate the remaining four fingers in order from the thumb. An arrow pointing upward indicates an extended motion, an arrow pointing downward indicates a gripped motion, and a blank space indicates no motion. A character followed by a prime (') symbol indicates a shifted or upper case character. Any assignment of characters to finger motions could be made. The assignment indicated is based partially on the standard typewriter keyboard (e.g., "m" is struck by moving the first finger downward), partially on the frequency of occurrence of the characters and the ease of making certain finger combination movements (e.g., "e" is struck by the relatively simple extended movement of two adjacent fingers), and partially on a logical basis suitable for rapid memory (e.g., the digits 1, 2, . . . 9, 0 are in a modified binary code). Optimum assignment of characters to finger movements would result from previously established procedures of experimentation as shown in A. Dvorak, N. L. Merrick, W. L. Dealey and G. C. Ford, Typewriter Behavior, 1936; and R. T. Griffith, The Minimotion Typewriter Keyboard, November 1949, J. Franklin Institute. Certain simple motions control, or partially control, basic operations, all numbers have the common requirement that the thumb be gripped. All upper case (') characters (except upper case numbers) have the common requirement that the thumb be extended. Some special characters (upper case number) have the common requirements that the thumb be gripped and the fourth finger extended. Gripping both the thumb and the fourth finger indicates carriage return, regardless of the positions of the first, second and third fingers. Many combinations are unassigned and could signify extra characters or even entire words and could be used in conjunction with the previously-mentioned "Word Writing Typewriter."

FIGS. 7a, 7b and 7c show a decoding circuit suitable to control a typewriter such as shown in a patent to Tholstrup, 2,573,370, issued October 30, 1951. FIG. 1 of the patent shows a remotely-operable typewriter with keys replaced by solenoids.

The symbols used are defined in R. K. Richards, Digital Computer Components and Circuits, D. von Nostrand Company, Inc., 1957. Flip-flops 41 through 50 are shown on page 71 of the reference, "and" gates 51 through 55 and "or" gate 86 are shown on page 38, and the diode matrix 56 is shown on page 57. The "and" and "or" gates shown as blocks on FIGS. 7a, 7b and 7c are shown schematically on FIG. 7d.

As the fingers are extended or gripped, each thimble element operates its respective switch contacts 26 and 28 setting one of the flip-flops 41 through 50. As soon as any finger is extended or gripped, one of the switches 28 is opened, releasing relays 60 and 61. Capacitor 62 is discharged through normally-closed contacts 63 of relay 61 and arc-suppressing resistor 65. The normally-open contacts 58 of the reset relay 60 inhibit matrix 56 from operating. This is necessary to permit the operator to move all of the thimble elements pertaining to a character before the decoder outputs are used. If this were not true, all finger movements would have to be simultaneous. After all thimble elements 6 required by the combination chosen from FIG. 6 have been moved and have been returned to the relaxed position, relay 61 operates through closed switches 28, opening the discharge circuit for capacitor 62, and relay 60 operates through switches 28 and series capacitor 62, permitting matrix 56 to provide a signal to the appropriate typewriter key solenoids 65 through the associated amplifier of amplifiers 66. An example of the operation of the decoder is found in the next paragraph. Operation of relay 60 also discharges capacitor 68 through contacts 69 and an arc-suppressing resistor 70. As current to capacitor 62 decreases to below a critical value, relay 60 releases, applying a positive voltage to capacitor 68 through contacts 58. Charge current to capacitor 68 through resistor 72 develops a positive voltage at the intersection of resistor 72 and capacitor 68, resetting flip-flops 41 through 50. The value of capacitance for capacitor 62 is determined by the time required for solenoids 39 to operate their associated typewriter keys; and is chosen, dependent upon the resistance and inductance of the winding of relay 60.

The following example of the operation of the circuit is based on the selection of the special character obtained by selecting 5' (shifted 5). In this case, FIG. 6 indicates that for the special character 5' the thumb is gripped, the first, third and fourth fingers are extended, and the second finger is relaxed. This sets flip-flops 41, 43, 47 and 50, developing a positive voltage at corresponding leads 74. Since the remaining flip-flops are not set, a positive voltage also appears on corresponding leads 76. A positive voltage is also present on lead 78, as "and" gate 33 has both inputs present. As a corollary, leads 80 are not positive. Vertical leads 82 and 84 in matrix 56 pass a positive output voltage to their respective amplifiers of the amplifiers 66 (the voltage at lead 84 is applied through "or" gate 86); no other vertical leads are positive as at least one diode connected to each of the other vertical leads is conducting through a lead 80. The positive signal on lead 82 operates the "5" solenoid and the signal on lead 84 operates the "shift" solenoid through "or" gate 86.

What has been described is a technique of man-machine communication involving a maximum of information transmitted through a minimum of physical motion through the utilization of all combinations of distinguishable directions of motion of all digital extremities. The invention has been illustrated showing the realization of letters and symbols on a conventional typewriter through the use of two directions of physical motion of the five digital extremities on one hand as an indication of the information density achievable with a portion of the available digital extremities employing only two directions of physical motion.

While the invention has been particularly shown and described with reference to a preferred embodiment thereof, it will be understood by those skilled in the art that the foregoing and other changes in form and details may be made therein without departing from the spirit and scope of the invention.

We claim:

1. A man-machine communication device comprising, in combination: a plurality of digital extremity receiving elements disposed about the relaxed position of an operator's fingertips, each said digital extremity receiving element being movable in at least two distinguishable directions; a plurality of transducer means each actuated by motion of each digital extremity receiving element in one direction; and signal means conditioned by combinations of actuated and non-actuated ones of said transducer means for delivering a signal indicative of combinations of movement by digital extremities in contact with said digital extremity receiving elements.

2. A man-machine communication device, comprising a plurality of movable control elements, each comprising two or more elements to present opposing surfaces to partially surround the distal phalanx of a finger, said control elements being relatively oriented so that their finger depressions are presented to distal phalanges of a relaxed hand, means mounting each of said control elements so that it is movable in the direction of movement of the corresponding distal phalanx as the respective finger is extended, relaxed and gripped, and a plurality of separate signal control means for each of said control elements positioned so as to be individually operated by the respective control element in different positions of the latter.

3. A man-machine communication device, comprising a plurality of movable control elements, each comprising two elements to present opposing surfaces to partially surround the distal phalanx of a finger, said control elements being relatively oriented so that their finger depressions are presented to distal phalanges of a relaxed hand; means mounting each of said control elements so that it is movable in the direction of movement of the corresponding distal phalanx as the respective finger is extended, relaxed and gripped; resilient means to bias said control element to a predetermined position corresponding to the relaxed position of the respective finger; and a plurality of separate signal control means positioned so as to be individually operated in different positions of said control element.

4. A man-machine communication device, comprising a plurality of movable control elements, each having a thimble-shaped finger depression to surround the distal phalanx of a finger, said control elements being relatively oriented so that their finger depressions are presented to distal phalanges of a relaxed hand, means mounting each of said control elements so that it is movable in the direction of movement of the corresponding distal phalanx as the respective finger is extended, relaxed and gripped, and a plurality of separate signal control means for each of said control elements positioned so as to be individually operated by the respective control element in different positions of the latter.

5. A man-machine communication device, comprising a plurality of movable, depressible, control elements, each having a thimble-shaped finger depression to surround the distal phalanx of a finger, said control elements being relatively oriented so that their finger depressions are presented to distal phalanges of a relaxed hand, means mounting each of said control elements so that it is movable in the direction of movement of the corresponding distal phalanx as the respective finger is extended, relaxed and gripped, and movable in another direction as the respective finger is depressed, and a plurality of separate signal control means for each of said control elements poistioned so as to be individually operated by the respective control element in different positions of the latter.

6. A man-machine communication device, comprising a plurality of movable control elements, each having a thimble-shaped finger depression to surround the distal phalanx of a finger, said control elements being relatively oriented so that their finger depressions are presented to distal phalanges of a relaxed hand; means mounting each of said control elements so that it is movable in the direction of movement of the corresponding distal phalanx as the respective finger is extended, relaxed and gripped; resilient means to bias said control element to a predetermined position corresponding to the relaxed position of the respective finger; and a plurality of separate signal control means positioned so as to be individually operated in different positions of said control element.

7. A man-machine communication device, comprising a plurality of movable, depressible, control elements, each having a thimble-shaped finger depression to surround the distal phalanx of a finger, said control elements being relatively oriented so that their finger depressions are presented to distal phalanges of a relaxed hand; first supporting means mounting each of said control elements so that it is movable in the direction of movement of the corresponding distal phalanx as the respective finger is extended, relaxed and gripped; first resilient means to bias said control element to a predetermined position corresponding to the relaxed position of the respective finger; second supporting means mounting said first supporting means so that said control element is movable in the direction of movement of the distal phalanx as the respective finger is depressed and relaxed; second resilient means to bias said first supporting means to a predetermined position corresponding to the relaxed position of the respective finger; and a plurality of separate signal control means for each of said control elements and respective first and second supporting means positioned so as to be individually operated in different positions of said control element.

8. A man-machine communication device, comprising a plurality of movable control elements, each having a thimble-shaped finger depression to surround the distal phalanx of a finger, said control elements being relatively oriented so that their finger depressions are presented to distal phalanges of a relaxed hand, means mounting each of said control elements so that it is movable in the direction of movement of the corresponding distal phalanx as the respective finger is extended, relaxed and gripped, and signal means conditioned by combinations of actuated and non-actuated ones of said indicating means for delivering a signal indicative of combinations of movement of distal phalanges.

9. A manually-operable, man-machine communication device comprising, in combination: a rigid frame comprising means whereby it can be relatively fixed in position with respect to the metacarpus of a hand and free to move with the metacarpus; a movable control element shaped and mounted on said frame to surround a distal phalanx; and means responsive to movement of said control element with respect to said frame for delivering a signal to the machine.

10. The device described in claim 9, characterized by the fact that the frame is shaped to provide a rest for the back of the metacarpus when the distal phalanges are in position to operate the control elements.

11. The device described in claim 9, characterized by the fact that the movement-responsive means comprises flexible conductors for transmitting signals to the machine.

12. A manually-operable, man-machine communication device comprising, in combination: a rigid frame comprising means whereby it can be relatively fixed in position with respect to the metacarpus of a hand and free to move with the metacarpus; a plurality of digital extremity receiving elements, each said digital extremity receiving element being movable in at least one distinguishable direction; transducer means actuated by motion of each digital extremity receiving element; and signal means, comprising flexible conductors connected to the machine, conditioned by combinations of actuated and non-actuated ones of said transducer means, for delivering a signal indicative of combinations of movement by digital extremities in contact with said digital extremity receiving elements.

13. A manually-operable, man-machine communication device comprising, in combination: a frame comprising means whereby it can be relatively fixed in position with respect to the metacarpus of a hand and free to move with the metacarpus; a plurality of digital extremity receiving control elements, each having a thimble-shaped finger depression to surround the distal phalanx of a finger, said control elements being relatively oriented so that their finger depressions are presented to distal phalanges of a relaxed hand; means mounting each of said control elements so that it is movable in the direction of movement of the corresponding distal phalanx as the respective finger is extended, relaxed and gripped; resilient means to bias said control element to a predetermined position corresponding to the relaxed position of the respective finger; and a plurality of separate signal control means, including a flexible conductor connected to the machine, positioned so as to be individually operated in different positions of said control element.

14. A manually-operable, man-machine communication device comprising, in combination: a frame comprising means whereby it can be relatively fixed in position with respect to the metacarpus of a hand and free to move with the metacarpus; a plurality of digital extremity receiving control elements, each having a thimble-shaped finger depression to surround the distal phalanx of a finger, said control elements being relatively oriented so that their finger depressions are presented to distal phalanges of a relaxed hand; first supporting means mounting each of said control elements so that it is movable in the direction of movement of the corresponding distal phalanx as the respective finger is extended, relaxed and gripped; first resilient means to bias said control element to a predetermined position corresponding to the relaxed position of the respective finger; second supporting means mounting said first supporting means so that said control element is movable in the direction of movemnt of the distal phalanx as the respective finger is depressed and relaxed; second resilient means to bias said first supporting means to a predetermined position corresponding to the relaxed position of the respective finger; and a plurality of separate signal control means, said plurality comprising a flexible conductor connected to the machine, for each of said control elements and respective first and second supporting means, positioned so as to be individually operated in different positions of said control element.

References Cited in the file of this patent
UNITED STATES PATENTS 2,581,665  Jarmann _____ Jan. 8, 1952

FOREIGN PATENTS 153,527  Germany _____ Aug. 4, 1904
308,048  Germany _____ Sept. 24, 1918